(12) United States Patent
Trinler et al.

(10) Patent No.: US 9,803,771 B2
(45) Date of Patent: Oct. 31, 2017

(54) LATCH DEVICE

(75) Inventors: Martin Trinler, Hockenheim (DE);
Wolfgang Todt, Klettgau (DE); Holger Lüüs, Waldshut-Tiengen (DE)

(73) Assignees: Deere & Company, Moline, IL (US);
Bucher Hydraulics GmbH, Klettgau (DE)

( * ) Notice: Subject to any disclaimer, the term of this patent is extended or adjusted under 35 U.S.C. 154(b) by 339 days.

(21) Appl. No.: 13/818,219

(22) PCT Filed: Aug. 16, 2011

(86) PCT No.: PCT/EP2011/064054
§ 371 (c)(1),
(2), (4) Date: Feb. 21, 2013

(87) PCT Pub. No.: WO2012/025424
PCT Pub. Date: Mar. 1, 2012

(65) Prior Publication Data
US 2013/0153053 A1  Jun. 20, 2013

(30) Foreign Application Priority Data
Aug. 24, 2010  (DE) .................. 10 2010 039 711

(51) Int. Cl.
F16K 31/06 (2006.01)
F15B 13/04 (2006.01)
(Continued)

(52) U.S. Cl.
CPC .......... *F16K 31/06* (2013.01); *F15B 13/0402* (2013.01); *F16K 31/0679* (2013.01);
(Continued)

(58) Field of Classification Search
CPC ................... H01F 7/124; H01F 7/1615; H01F 2007/1692; F15B 13/0402; F16K 11/0704; F16K 31/0679
(Continued)

(56) References Cited

U.S. PATENT DOCUMENTS 2,112,251 A * 3/1938 Pfau .......................... H02J 3/08
200/80 R
2,377,515 A * 6/1945 Ray .............................. 335/254
(Continued)

FOREIGN PATENT DOCUMENTS

DE  1057843  5/1959
DE  4012832 C2  9/1995
(Continued)

OTHER PUBLICATIONS

American Heritage Dictionary definitions of "coaxial" and "around". 2015.*

*Primary Examiner* — Nathaniel Wiehe
*Assistant Examiner* — Michael Quandt
(74) *Attorney, Agent, or Firm* — Kilpatrick Townsend & Stockton, LLP

(57) ABSTRACT

A latch device (12) for a hydraulic valve (10) is proposed. The latch device (12) comprises a housing (22) and a latch shaft (26), which is supported such that it can move in the housing (22). In order to create a latch device (12), independent of the hydraulic provisioning, the provision of at least one magnetizable ring beam arrangement (38), which is supported on the latch shaft (26), and an electric solenoid arrangement (40), located on the housing (22) around the ring beam arrangement (38) is also proposed, wherein by the supply of current to the solenoid arrangement (40), a positioning force can be produced on the ring beam arrangement (38). Furthermore, a hydraulic valve (10) with the corre-
(Continued)

Figure 1:
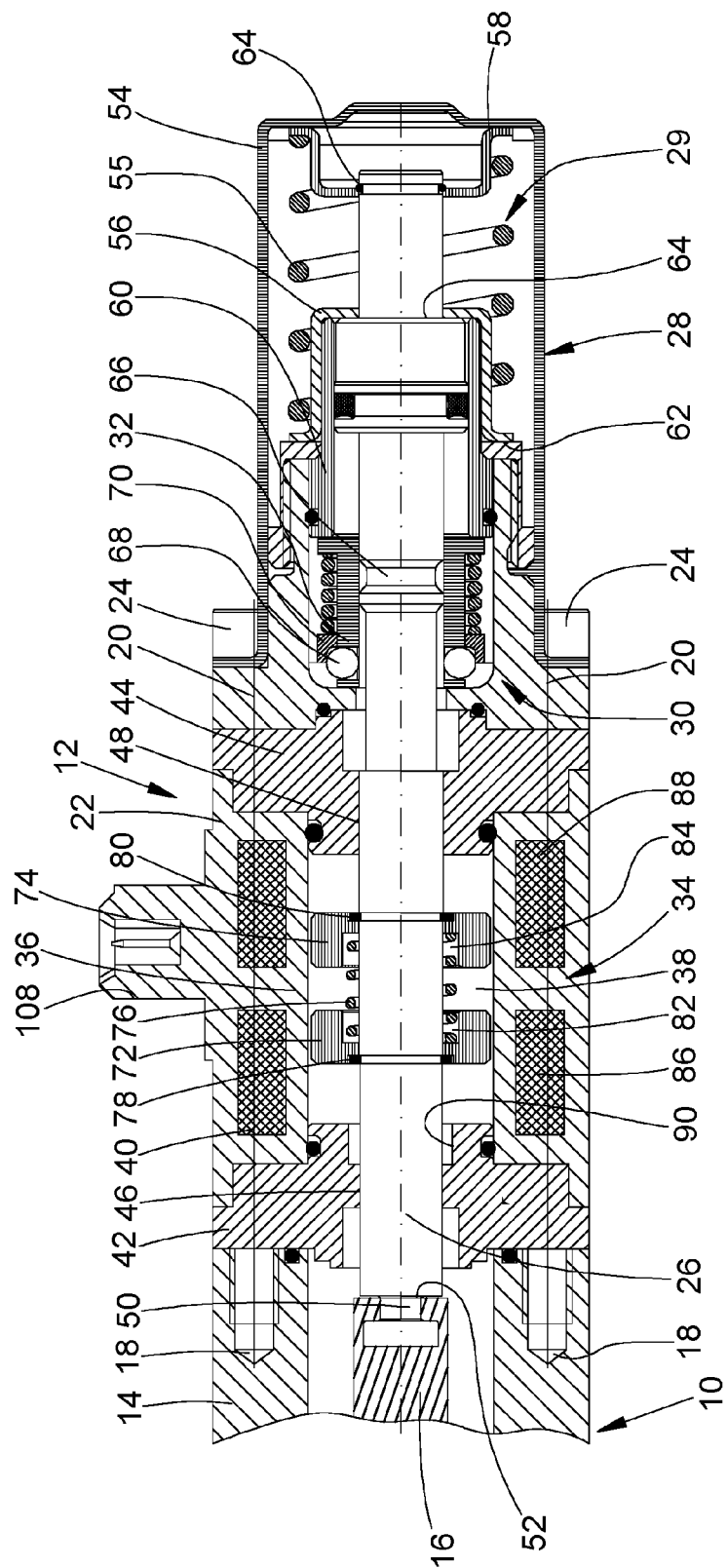

sponding latch device (12) and a hydraulic arrangement (92) for such a valve (10) are also proposed.

19 Claims, 3 Drawing Sheets

(51) Int. Cl.
    *H01F 7/16*     (2006.01)
    *F16K 11/07*     (2006.01)
    *H01F 7/124*     (2006.01)

(52) U.S. Cl.
    CPC .......... *F16K 11/0704* (2013.01); *H01F 7/124* (2013.01); *H01F 7/1615* (2013.01); *H01F 2007/1692* (2013.01); *Y10T 137/5987* (2015.04)

(58) Field of Classification Search
    USPC ....................................... 91/358 A
    See application file for complete search history.

(56) References Cited

U.S. PATENT DOCUMENTS

| | | | | |
|---|---|---|---|---|
| 2,446,855 A | * | 8/1948 | Seibel | H01F 7/1607 335/253 |
| 2,630,136 A | * | 3/1953 | Treseder | F15B 13/12 137/625.65 |
| 2,632,821 A | * | 3/1953 | Wright | H01F 7/124 192/89.1 |
| 3,235,777 A | * | 2/1966 | Hatashita | 335/254 |
| 3,549,917 A | * | 12/1970 | Weyer et al. | 310/14 |
| 3,667,723 A | * | 6/1972 | Schneider | 251/68 |
| 3,743,898 A | * | 7/1973 | Sturman | F02D 41/20 335/254 |
| 3,762,442 A | * | 10/1973 | Paul | F16K 11/0704 137/625.2 |
| 3,994,473 A | * | 11/1976 | Wilke | F16K 11/0704 137/625.69 |
| 4,195,551 A | * | 4/1980 | Schmiel | 91/358 A |
| 4,525,695 A | * | 6/1985 | Sheng | H01F 7/1615 137/625.65 |
| 4,531,709 A | * | 7/1985 | Maddalozzo | E02F 9/2267 137/625.69 |
| 8,006,719 B2 | * | 8/2011 | Nordstrom et al. | 137/625.68 |
| 2009/0224191 A1 | | 9/2009 | Nam | |

FOREIGN PATENT DOCUMENTS

| | | |
|---|---|---|
| DE | 102007005980 A1 | 8/2008 |
| DE | 102004049963 B4 | 11/2008 |
| DE | 102005017328 B4 | 12/2008 |
| DE | 102007057882 A1 | 6/2009 |
| DE | 102008032219 A1 | 1/2010 |

* cited by examiner

LATCH DEVICE

The invention concerns a latch device for a hydraulic valve, with a housing and a latch shaft, which is supported such that it can move in the housing. Furthermore, the invention concerns a hydraulic valve with such a latch device and a corresponding hydraulic arrangement.

Hydraulic arrangements for agricultural vehicles, in particular, tractors or harvesting machines, are known, which comprise hydraulic valves with latch devices. Latch devices are used so as to create a retention force on a hydraulic valve or in order to hold a valve slide, located in the hydraulic valve, in a controlled position. It is not unusual thereby to use hydraulic valves with four selectable slide positions, which can be mechanically controlled via an actuation lever in the driver's cabin. The slide positions usually comprise a lifting, a neutral, a lowering, and a floating position. As a rule, the slide position is mechanically latched in the floating position—that is, after bringing the valve slide into the floating position by actuating the actuation lever, the floating position is also retained after releasing the actuation lever. Furthermore, it is known that latch devices are also provided for the lifting and lowering positions. The latch functions are often not desired for every type of operation; it is also typical to provide for different modes, which can be activated by a user as a function of the use. A latch mode can be provided, for example, for the operation of a front loader in which the latch function is deactivated. Furthermore, a latch mode can be provided, which provides for a deactivation of the latch function upon attaining a certain operating pressure. Another latch mode can provide a continuous latching, for example, for the operation of hydraulic motors. Moreover, the equipping of such hydraulic valves with one function is known; this retains a resetting of the valve slide into the neutral position if the hydraulic provisioning fails. The latter function is prioritized as a primary function, in comparison to the previously described latch modes, so that latch devices can usually be made as hydraulic switching elements, with which a deactivation of a latch function is ensured with the suspension of the hydraulic provisioning. The disadvantage is that both the activation as well as the deactivation of a latch function can take place only as a function of a hydraulic energy provisioning. Hydraulic latch devices are usually affixed as independent components on the valve housing. For the preparation of the latch modes, such latch devices are provided with an adjusting agent, by means of which the correspondingly desired latch mode can be selected. The adjusting agent for the adjustment or selection of the latch modes is thereby directly located on the latch device and thus, in a disadvantageous manner, not in the immediate vicinity of the actuation lever of the hydraulic valve. Furthermore, it is disadvantageous that with the positioning of the valve for the operating feasibility of the adjusting agent, accessibility by an operator must be taken into consideration, wherein positioning possibilities are limited.

The goal of the invention is to indicate a latch device of the type mentioned in the beginning, by means of which the aforementioned problems are overcome.

The goal is attained, in accordance with the invention, by the teaching of Patent Claims 1, 12, and 13.

Other advantageous developments and refinements of the invention can be deduced from the subclaims.

In accordance with the invention, a latch device of the type mentioned in the beginning is constructed in such a way that the latch device comprises at least one magnetizable ring beam arrangement, which is supported on the latch shaft, and an electrical solenoid arrangement, which is located on the housing, around the ring beam arrangement, wherein by supplying the solenoid arrangement with current, a positioning force can be produced on the ring beam arrangement. Given that the latch device is operated electromagnetically, the activation or deactivation of a latch function does not only take place as a function of a hydraulic energy supply, but rather any sensorically determinable criteria can be created as the basis for activation and deactivation. Furthermore, limitations for the positioning of the adjusting agent can be avoided, since the adjusting agent provided for the selection of the latch modes need not be placed directly on the latch device, but rather can be placed on any site in the driver's cabin, in particular, in the immediate vicinity of the actuation lever of the hydraulic valve.

The ring beam arrangement is placed coaxial to the latch shaft and is connected with it such that the positioning force produced by the supply of current to the solenoid arrangement, in the axial direction of the latch shaft, can be transferred to the latch shaft. The ring beam arrangement can thereby be set in different ways on the latch shaft, whether with a shaft shoulder, securing ring, or by another axial securing means.

The latch shaft is connected with an adjusting spring arrangement, by means of which the latch shaft can be pushed, with the ring beam arrangement, into a neutral position, wherein, in the neutral position, the ring beam arrangement is aligned in the middle, relative to the solenoid arrangement. The neutral position provides for the interruption of the hydraulic connections that are controlled via the hydraulic valve—that is, for the hydraulic valve to be brought to a closed position. The adjusting spring arrangement ensures that if a positioning force is not exerted on the latch shaft, then the latch shaft and a valve slide connected with it are correspondingly brought to the neutral position by the positioning force produced by the adjusting spring arrangement. The adjusting spring is made and placed in such a way that as soon as the valve slide or the latch shaft are moved out of the neutral position, a positioning force acting against the movement is produced. The adjusting spring arrangement can comprise one or more adjusting springs in the form of a coil spring or a spiral spring or the like.

The solenoid arrangement comprises a first and a second solenoid, preferably with opposite poles, wherein the solenoids are placed center-symmetrically relative to the solenoid arrangement. Center-symmetrically means that the solenoid arrangement has a symmetry line and is constructed the same on both sides of the symmetry line—i.e., a solenoid is constructed on both sides of the symmetry line. The ring beam arrangement is made and placed in such a way that it is positioned in the neutral position of the latch shaft, in the center, relative to the symmetry line of the solenoid arrangement.

The latch shaft can be moved, with the ring beam arrangement, into a first deflection position, wherein with the first deflection position, the ring beam arrangement can be brought into the direction of the first solenoid. This means that if the hydraulic valve is actuated and the valve slide is shifted into a first deflection position, the same also occurs with the latch shaft. Accordingly, the ring beam arrangement, supported on the latch shaft, is thereby shifted in the direction of the first solenoid.

Accordingly, the valve slide and the latch shaft can be shifted, with the ring beam arrangement, into a second deflection position, opposite the first deflection position, wherein with the second deflection position, the ring beam arrangement can be brought in the direction of the second solenoid.

As a whole, the solenoid arrangement can receive a current supply in such a way that a magnetic retention force acting on the ring beam arrangement can be produced, which holds the ring beam arrangement in one of its deflection positions, wherein in the first deflection position, a current supply of the first solenoid can be activated, and in the second deflection position, a current supply of the second solenoid can be activated. With an activation of the current supply of one solenoid, the other solenoid is correspondingly deactivated. In the neutral position, a current supply of the solenoid arrangement is deactivated—that is, the current supply to both solenoids is interrupted, so that the positioning force of the adjusting spring arrangement, built up during the shifting from the neutral position, acts alone on the latch shaft and thus on the valve slide. In order to make ready specific latch modes, a deactivation of the current supply both in the first as well as in the second deflection positions can also take place, as a function of various status parameters, whether a hydraulic working pressure (or load pressure), an rpm of a hydraulic pump, a hydraulic consumer, a combustion engine, etc.

In one alternative embodiment, the latch device can also be constructed in such a way that in the first deflection position, a current supply of the first and second solenoids, or in the second deflection position, a current supply of the first and second solenoids can be activated, and in the neutral position, a current supply of the solenoid arrangement can be deactivated. A deactivation of one solenoid with an activation of the other solenoid then does not take place. In this way, the electronic switching on of the solenoid arrangement can be simplified, so that with a current supply of the solenoid arrangement or the solenoids, there need not be a distinction made between the deflection positions. A deactivation of the solenoids in the neutral position and in the deflection positions, as a function of different status parameters, can take place as already described above.

The ring beam arrangement can be ensured axially, on both sides, by a retention ring and can comprise at least one ferromagnetic adjusting ring. The retention ring can be constructed as a securing ring or tension ring located in an annular ring of the latch shaft. However, it is also conceivable to provide such a retention ring only on one side and to secure the other side by means of a shoulder constructed on the latch shaft. The adjusting ring must be dimensioned and made ferromagnetic in such a way that the magnetic force produced by the solenoids can produce a retention force that is correspondingly needed.

The latch device can also comprise a mechanical latch, wherein the mechanical latch comprises at least one ball placed on the circumference of the latch shaft, an annular groove introduced in the latch shaft, and a control element acted on by a positioning force, wherein the control element engages with the ball in such a way that the ball can be pushed into the annular groove in accordance with the positioning force. The control element can be an adjusting ring or an annular piston, which is supported in such a way that it can be moved on the latch shaft and can be actuated hydraulically and which holds the ball in the annular groove, or in a correspondingly controlled manner, releases the ball.

The ring beam arrangement can comprise a first ferromagnetic adjusting ring, a second ferromagnetic adjusting ring, and a tension element, located between the adjusting rings, by means of which the adjusting rings can move apart axially and can be pushed against the pertinent retention rings. The adjusting rings and the tension element are to be understood thereby as a uniform ring beam arrangement, which is placed on the latch shaft by corresponding retention rings, in accordance with the definition above, and are secured axially.

The ring beam arrangement can be brought into a third deflection position, which can move beyond the first or second deflection positions, in which the two adjusting rings can be brought to the opposite stop by the tension element, against a positioning force. The third deflection position is, for example, assumed, if the valve slide is brought into a floating position. Proceeding from the neutral position, the third deflection position goes thereby beyond the first or second deflection positions. In accordance with the above embodiments, a mechanical latch can be provided for such a third deflection position; it can also be activated, independently of the electromagnetic latch function, mechanically, hydraulically or hydromechanically.

The latch device mentioned above, in all the embodiments described above, can be used in a hydraulic valve, wherein the hydraulic valve is constructed with a valve housing and a valve slide, supported in such a way that it can be moved in the valve housing, and wherein the valve housing and the housing of the latch device and the valve slide and the latch shaft are connected with one another as one piece or in several parts.

Furthermore, the aforementioned latch device, with all its embodiments described above, can be used in a hydraulic valve of a hydraulic arrangement, wherein the hydraulic arrangement also comprises an actuating lever for the actuation of the hydraulic valve and a hydraulic consumer, connected with it, a hydraulic pump, connected with the hydraulic valve, a hydraulic tank, connected with the hydraulic valve, at least one sensor device, connected with the hydraulic consumer and/or the hydraulic valve, an entry device, and an electronic control unit, connected with the sensor device and the entry device. The sensor device can thereby be designed, in particular, for the recording of a working pressure acting in the hydraulic valve. The solenoid arrangement, provided in the latch device, can receive a current supply from the control unit as a function of the sensor device and the entry device. Such hydraulic arrangements can be found, for example, on construction or agricultural equipment, and are used so as to act on corresponding hydraulic consumers from a driving cab or a vehicle cabin.

With the aid of the drawings illustrating an embodiment example of the invention, the invention below and other advantages and advantageous refinements and developments of the invention are described and explained in more detail.

Figure 2:
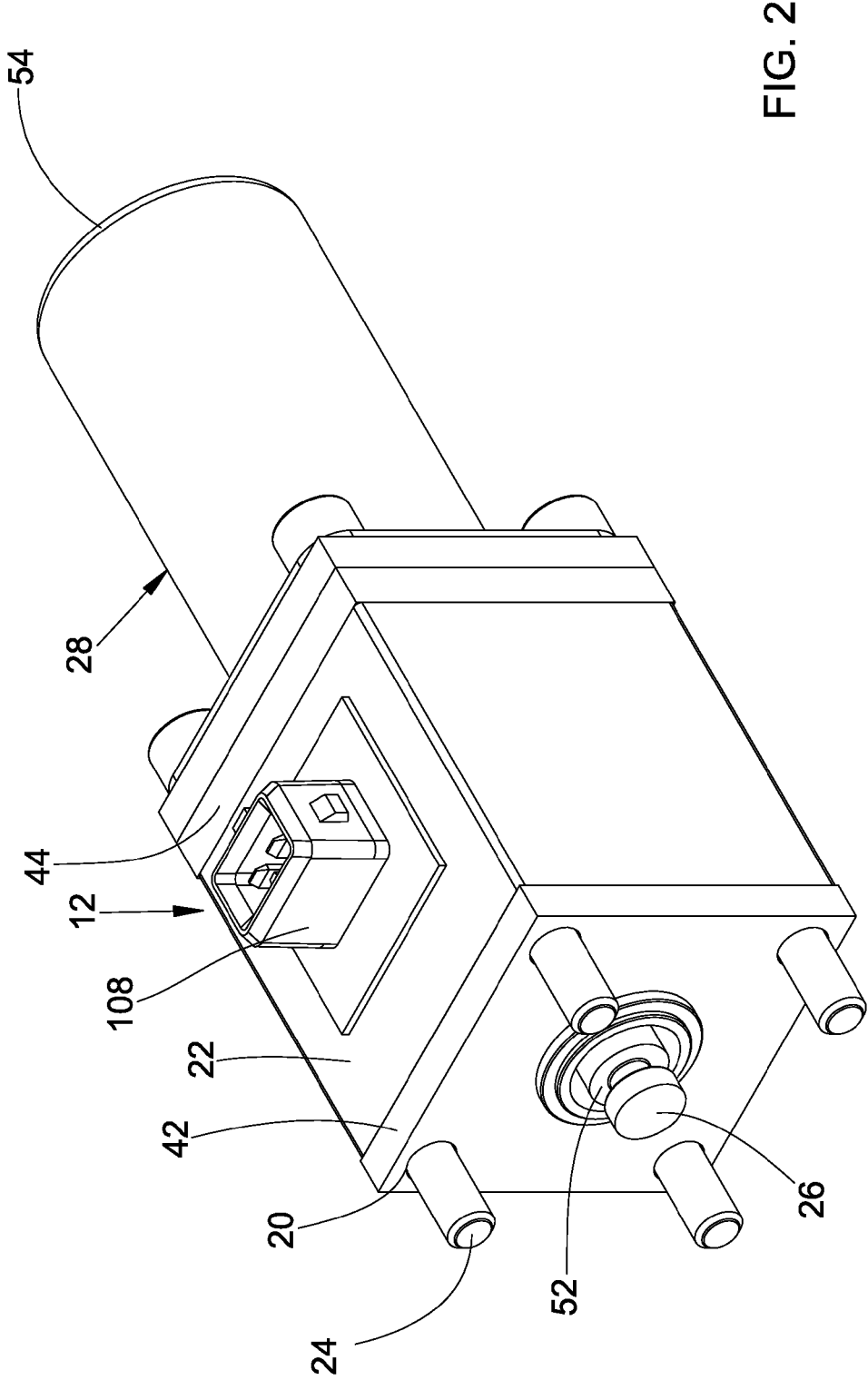
Figure 3:
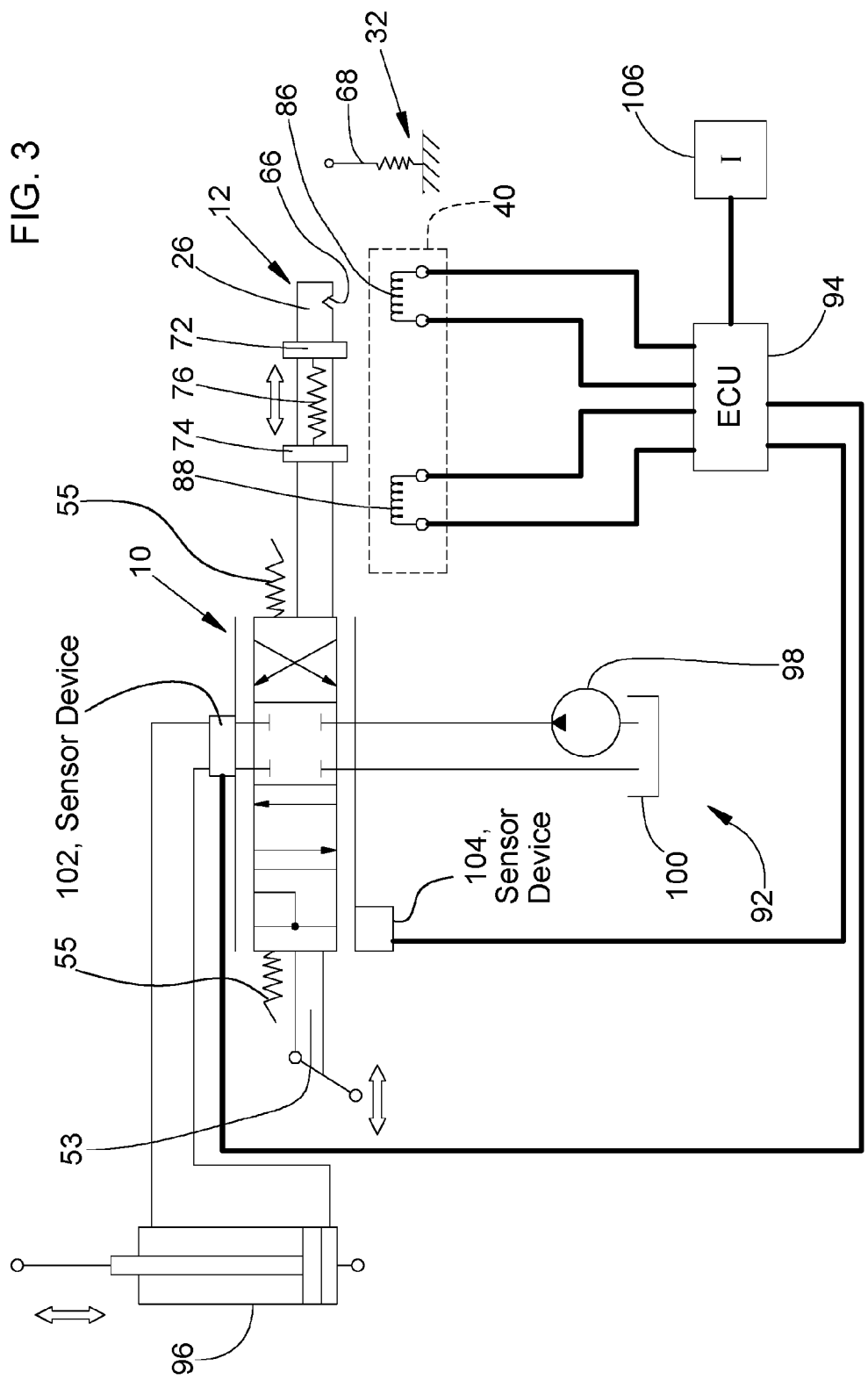

The figures illustrate:

FIG. 1, a schematic cross-sectional view of a latch device in accordance with the invention, in a state where it is mounted on a hydraulic valve;

FIG. 2, a perspective side view of a latch device in accordance with FIG. 1 in a state where it is not mounted; and FIG. 3, a schematic circuit diagram of a hydraulic arrangement in accordance with the invention, with a latch device in accordance with FIGS. 1 and 2.

FIG. 1 shows a latch device 12, connected to a hydraulic valve 10. The valve 10 comprises a valve housing 14 and a valve slide 16, which is supported in such a way that it can move in it axially. The valve 10 is designed, for example, as a 4/4-way valve and has a first deflection position, for example, a lifting position, a neutral position, a second deflection position, for example, a lowering position, and a third deflection position, for example, a floating position. By the actuation of the valve slide 16, the corresponding positions are set. The valve housing 14 has affixing boreholes 18. As can be seen, in particular, in FIG. 2, correspondingly aligned passage boreholes 20 are located on a housing 22 of the latch device 12, wherein the housing 22 of the latch device 12 is affixed to the valve housing 14 with affixing bolts 24.

The latch device 12 also comprises a latch shaft 26, which is supported in such a way that it can be moved axially in the housing 22. The housing 22 comprises, moreover, an adjusting spring area 28 with an adjusting spring arrangement 29, a first latch area 30 for a mechanical latch 32, and a second latch area 34 for an electromagnetic latch 36, in which a ring beam arrangement 38, and a solenoid arrangement 40 are located.

The second latch area 34 of the housing 22 is delimited by a first and second housing wall 42, 44 and has a storage area 46, 48 for the axially movable storage unit of the latch shaft 26.

On the first housing wall 42, the housing 22 is flanged on the valve housing 14 by means of the affixing bolts 24, wherein the latch shaft 26 is connected with the valve slide 16, preferably by a common plug connection in the form of a plug groove or a clevis 50, which engages the annular grove 52, constructed on the latch shaft 26. By the direct connection of the latch shaft 26 with the valve slide 16, the latch shaft 26 also assumes, with the actuation of the valve slide 16 by an actuating lever 53 (see FIG. 3), a corresponding first deflection position or lever position, neutral position, second deflection position or lowering position, or a third deflection position or floating position.

The first latch area 30, and adjacent to it, the adjusting spring area 28, follow the second housing wall 44. The two areas of the housing 22 are connected with the second housing wall 44 or with the second latch area 34 by means of the affixing bolts 24.

The adjusting spring area 28 has a housing cup 54, which is affixed to the first latch area with the affixing bolts 24 and encloses the adjusting spring arrangement 29. The adjusting spring arrangement 29 comprises an adjusting spring 55, which is designed as a coil spring and which is tensioned between a first cup-like bearing bush and a second cup-like bearing bush 58. The first bearing bush 56 is supported on a support sleeve 60, constructed on the first latch area 30, so that it can move axially, wherein the bearing bush 56 is supported, on the one hand, on the border side against a delimiting ring 62, which is constructed on the first latch area 30, and, on the other hand, on the inner bottom side against a shoulder 64, which is constructed on the latch shaft, so that the first bearing bush 56 can be moved axially, on the one hand, on the bearing bush 60 and, on the other hand, on the latch shaft 26 in the direction of the second bearing bush 58. The second bearing bush 58 is supported on the latch shaft 26 so it can move axially, wherein the bearing bush 58 is supported, on the one hand, on the border side against the housing cup 54 and, on the other hand, on the inner bottom side against a securing ring 64, located on the latch shaft 26, so that the second bearing bush 58 can be moved axially on the latch shaft 26 in the direction of the first bearing bush 56. This arrangement of the adjusting spring 55 causes the latch shaft 26 to be moved axially—that is, it is moved from a preset neutral position—to move the cup-like bearing bushes 56, 58 toward one another and to compress the adjusting spring 55. In this way, a positioning force or resetting force is produced, by means of which the latch shaft 26 is pushed into its neutral position.

The first latch area 30, in which the mechanical latch 32 is located, encloses an area of the latch shaft 26, which is provided with an annular groove 66. Furthermore, latch balls 68 are placed on the latch shaft 26 in a distribution along the circumference. The latch balls 68 are pressed against the surface of the latch shaft 26 by a control element 70, designed as a spring-pretensioned adjusting ring, wherein a corresponding positioning force is exerted on the latch balls by the spring pretension of the control element 70. As soon as the latch shaft 26 is shifted in such a way that the annular groove 66 can engage with the latch balls 68, the latter are pressed by the control element 70 into the annular groove 66, wherein the latch shaft 26 locks in and is held in this position. The position of the latch shaft 26 in which the mechanical latch 32 locks into is the floating position for the valve slide 16 in the example shown. Upon latching in the floating position, the counteracting positioning force of the adjusting spring 55 must be overcome with an actuation force acting on the valve slide and be held by the retention force of the mechanical latch 32; accordingly, the retention force of the mechanical latch 32 must be greater than the positioning force of the adjusting spring 55, so that the latch shaft locks in and holds, reliably and continuously, in the floating position. In order to move the valve slide 16 or the latch shaft 26 from the floating position, a lower actuation force, on the other hand, must be applied, since the actuation of the valve slide 16 is supported by the positioning force of the adjusting spring 55.

The ring beam arrangement 38, located in the second latch area 34, comprises a first and a second adjusting ring 72, 74. The adjusting rings 72, 74 are made from a ferromagnetic material—that is, from a material or substance which can be magnetized by a solenoid with a current supply. The adjusting rings 72, 74 are arranged so they can move axially on the latch shaft 26 and are pressed against retention rings 78, 80, located on the latch shaft 26 by a tension element 76 in the form of a coil spring. The adjusting rings 72, 74 can thus be moved toward one another against the spring force or positioning force of the tension element 76, wherein the tension element 76 can be lowered to the adjusting rings 72, 74 in correspondingly designed recesses 82, 84, so that the positioning rings 72, 74 can be brought to the opposite stop.

The solenoid arrangement 40, located in the second latch area 34, comprises a first and a second solenoid 86, 88. The solenoids 86, 88 are enclosed coaxially, relative to the latch shaft 26, and around the ring beam arrangement 38 in the housing wall of the housing 22. Furthermore, the solenoids 86, 88 are placed, with reference to the longitudinal direction of the latch shaft 26, symmetrically to the center of the ring beam arrangement 38, so that there is a solenoid 86, 88 at the level of an adjusting ring 72, to the right and to the left of the center of the ring beam arrangement 38. In other words, the ring beam arrangement 38 is in the center, relative to the solenoid arrangement 40, in the neutral position of the valve slide 16. The arrangement of the adjusting rings 72, 74 with reference to the first housing wall 42 and the second housing wall 44 is dimensioned in such a way that with an axial shift of the valve slide 16 into a first deflection position or lowering position, the first position 72 comes to a stop at the first housing wall 42 and with an axial shift of the valve slide 16, into a second deflection position or lifting position, the second adjusting ring 74 comes to a stop at the second housing wall 44. Furthermore, in the first housing wall 42 in the area of the storage position 62, a radial recess 90 is provided, which extends along the latch shaft 26 and is dimensioned in such a way that an axial shaft of the valve slide 16 into the third deflection position corresponding to the floating position is made possible. This takes place in such a way that the retention ring 78 can be lowered into the recess 90, whereas the first adjusting ring 72 comes to a stop at the first housing wall 42 and the second adjusting ring 74, at the first adjusting ring 72. The tension element 76 is thereby compressed and is lowered, in turn, into the recesses 82, 84, constructed on the adjusting rings 72, 74.

By the corresponding supply of current to the solenoid arrangement 40 or the solenoids 86, 88, retention forces and thus latching states for the latch shaft or the valve slide 16 can be attained upon actuation of the valve slide 16 by the actuating lever. Upon moving the valve slide 16 from the neutral position into the first deflection position or lowering position, the first adjusting ring 72 is moved toward the first solenoid 86 and to the first housing wall 42. A supply of current to the first solenoid 86 then brings about a magnetization of the ferromagnetic first adjusting ring 72, wherein a retention force in the direction of the first housing wall 42 is exerted on the adjusting ring 72. The adjusting ring 72 is therefore held in the lowering position, with a specific retention or latching force that exceeds a resetting force applied by the adjusting spring 55. As soon as the supply of current to the first solenoid 86 is cancelled, the retention force is also cancelled, and the latch shaft 26 or the valve slide 16 is again brought to the neutral position by the resetting force of the adjusting spring 55. Upon moving the valve slide 16 from the neutral position into the second deflection position or lifting position, the second adjusting ring 74 is moved toward the second solenoid 88 or to the second housing wall 44. A supply of current to the second solenoid 88 then brings about a magnetizing of the ferromagnetic second adjusting ring 74, wherein a retention force in the direction of the second housing wall 44 is exerted on the adjusting ring 74. The adjusting ring 74 is therefore held in the lifting position with a specific retention or latching force, which exceeds a resetting force applied by the adjusting spring 55. As soon as the supply of current to the second solenoid 88 is cancelled, the retention force is also cancelled, and the latch shaft 26 or the valve slide 16 is again brought to the neutral position by the resetting force of the adjusting spring 55. In both cases, the retention forces can vary by a corresponding supply of current and the design of the solenoids 86, 88 and of the adjusting rings 72, 74. With a shift of the valve slide 16 into the third deflection position or the floating position, the first adjusting ring is also moved toward the first solenoid 86 or toward the first housing wall 42, wherein, moreover, the latch shaft 26 is shifted further a bit, until the second adjusting ring 74 comes to a stop on the first adjusting ring 72, and the latch balls 68 engage the annular groove 66 and produce an additional retention force or latching force. Depending on the development, the shifting into the floating position can take place, with or without a supply of current to the first solenoid 86, wherein a supply of current to the first solenoid 86 would relieve the mechanical latch 32, since the mechanical latch would then not have to apply the complete resetting force of the adjusting spring 55 and the resetting force of the adjusting element 76, but rather a part can be applied by the retention force of the solenoid 86.

As is shown in FIG. 3 for a possible hydraulic arrangement 92, a supply of current to the solenoid arrangement 40 takes place by an electronic control unit 94, connected with the solenoid arrangement 40. In addition to the hydraulic valve 10 with the latch device 12, the hydraulic arrangement 92 comprises a hydraulic consumer 96 connected with the valve 10—here, in the form of a hydraulic cylinder, and a hydraulic pump 98 connected with the hydraulic valve 10, a hydraulic tank 100 connected with the hydraulic valve 10, at least one sensor device 102, 104 connected with the hydraulic pump 98 and/or the hydraulic valve 10, and an input device 106.

Via the actuating lever 53, the valve 10 can be switched into its corresponding positions (lowering position, neutral position (as depicted), lifting position, and floating position). For example, if the hydraulic cylinder is moved into the lowering position, then the valve 10 is closed in the neutral position; the hydraulic cylinder is moved out in the lifting position; and in the floating position, both chambers of the hydraulic cylinder are connected with the hydraulic tank; and the connection to the hydraulic pump 98 is interrupted. In the floating position (left position of the valve in FIG. 3), the latch shaft 26 arrives, with its groove, in the area of the latch balls 68 and is held, mechanically locked with a specific retention force in this position. As already mentioned, a supply of current to the electromagnetic latch 36 can take place in a first latching mode for the support of the mechanical latch 32, if switching into the floating position is carried out. In this respect, a corresponding entry in the input device 106 is undertaken or the control unit 94 is correspondingly programmed. The floating position can be detected by the sensor device 104 (here a position sensor) and a corresponding control signal can be sent to the control unit 94; then a supply of current to the solenoid 40 can take place via a corresponding electrical connecting device 108. In this case, a supply of current to the solenoid 86 would take place, wherein a magnetization of the adjusting ring 72, and thus a retention force supporting the mechanical latch 32 would be produced. Instead of a sensor device 104, an interconnection, for example, from the current lines, leading to the solenoids 86, 88, with the valve slide 16 or the latch shaft 26, can also take place, so that a corresponding supply of current to the solenoids 86, 88 is triggered by moving the valve slide 16 or the latch shaft 26.

In another latching mode, which can be undertaken via a corresponding entry in the input device 106, a deactivation of the electromagnetic latch 36 is provided—that is, a control signal for the supply of current to the solenoid arrangement 40 is not generated in any of the valve positions. The valve slide 16 is brought to its neutral position by the adjusting spring 55, as soon as the actuating lever 53 is released (unless the valve slide is in the floating position, in which the mechanical latch 32 is engaged). Such a latch mode ("loader operation") is usually selected if a front loader is operated or if a latch function of the valve slide position is not desired.

For the operation of, for example, a hydraulic motor or other continuously operated consumers, it is often desirable to provide a continuous latching, so that the actuating lever need not be continuously held. In this regard, another latching mode ("motor operation") is provided for a continuous operation, which can also be adjusted via the input device 106. The control unit 94 thereby records a corresponding signal from the sensor unit 104 with regard to the position of the valve slide 16 and, depending on the valve slide position (lowering position or lifting position), generates a corresponding supply of current to the solenoid arrangement 40 (in the lowering position, the solenoid 86 is supplied with current, and in the lifting position, the solenoid 88).

Furthermore, another latching mode is provided, which provides a pressure-dependent switching off—that is, upon attainment of a specifiable hydraulic working pressure (or load pressure), a de-latching is undertaken or the electromagnetic latching 36 is cancelled. This latching mode (cylinder operation) is, for example advantageous during the operation of a hydraulic cylinder, so that a specific working pressure cannot be exceeded by mistake. In this regard, an operator can make a corresponding latching mode selection on the input device 106 and enter a desired maximum working pressure. The entry of the working pressure can thereby take place on a separate input device (not depicted) or on the same one. The sensor device 102 can be, for example, directly connected with the work connections of the hydraulic consumer 96. Via the sensor device 102, designed as a pressure sensor, it is possible to monitor the working pressure and to transmit a corresponding signal to the control unit 94. Should the detected working pressure exceed or reach the established maximum working pressure, then a supply of current to the solenoid arrangement 40, undertaken beforehand by the control unit 94, is interrupted, as a result of which the valve slide 16 is again brought to its neutral position by the adjusting spring 55.

Furthermore, the working pressure is constantly monitored by the sensor unit 102 and by the control unit 94 in case of a failure of the hydraulics; as a result of the working pressure loss which then occurs, an immediate deactivation of the latching function of the electromagnetic latch 36 is introduced, whereupon the valve slide 16 is again automatically moved or shifted to its neutral position.

Instead of a sensor unit 102 monitoring the working pressure, or in addition to a sensor unit 102 monitoring the working pressure, it is also possible to use a sensor which monitors the rpm of a motor of a vehicle or device equipped with the hydraulic arrangement and the control unit 94 for the control of the supply of current to the electromagnetic latch 36.

Furthermore, other criteria and system variables can be monitored by sensors and be used for the control of supply of current to the electromagnetic latch 36, wherein more extensive latching modes are also conceivable, which can be applied to other application examples not described here.

If there should be a failure in the electronics, then the valve slide is also shifted to its neutral position by the adjusting spring 55.

In that the input device 106 is not mechanically coupled to the latch shaft 26, it can be advantageously located adjacent to the actuating lever 53 or on another site, wherein a simple and practicable operation of the latch mode selection can be carried out.

The invention claimed is:

1. A latch device for a hydraulic valve, the latch device comprising:
   a housing having a first housing wall and a second housing wall;
   a latch shaft movable within the housing;
   a magnetizable ring beam arrangement that is coupled to the latch shaft between the first housing wall and the second housing wall, the magnetizable ring beam arrangement comprising:
      a first ferromagnetic-adjusting ring,
      a first retention ring positioned on a first side of the magnetizable ring beam arrangement and securing the first ferromagnetic-adjusting ring axially around the latch shaft,
      a second ferromagnetic-adjusting ring,
      a second retention ring positioned on a second side of the magnetizable ring beam arrangement that is opposite to the first side and securing the second ferromagnetic-adjusting ring axially around the latch shaft, and
      a tension element positioned between the first ferromagnetic-adjusting ring and the second ferromagnetic-adjusting ring; and
   an electrical solenoid arrangement positioned within the housing and coaxially around the magnetizable ring beam arrangement, wherein the electrical solenoid arrangement is configured to: (i) receive a first electrical signal and responsively generate a first positioning force on the magnetizable ring beam arrangement configured to cause the magnetizable ring beam arrangement to move, in a first direction, into a first deflection position at which the magnetizable ring beam arrangement contacts the first housing wall and the tension element is uncompressed, (ii) receive a second electrical signal and responsively generate a second positioning force on the magnetizable ring beam arrangement configured to cause the magnetizable ring beam arrangement to move, in a second direction, into a second deflection position at which the magnetizable ring beam arrangement contacts the second housing wall and the tension element is uncompressed, the second direction being opposite to the first direction, and (iii) receive a third electrical signal and responsively generate a third positioning force on the magnetizable ring beam arrangement configured to cause the magnetizable ring beam arrangement to move in the first direction past the first deflection position and into a third deflection position at which the magnetizable ring beam arrangement contacts the first housing wall and the tension element is compressed.

2. The latch device of claim 1, wherein the magnetizable ring beam arrangement is positioned coaxially around the latch shaft and configured to move the latch shaft along a longitudinal axis of the latch device in response to a positioning force.

3. The latch device of claim 1, further comprising an adjustment spring arrangement coupled to the latch shaft for exerting a force on the latch shaft configured to move the latch shaft into a neutral position that is between the first deflection position and the second deflection position, wherein a longitudinal center of the magnetizable ring beam arrangement is in alignment with a longitudinal center of the electrical solenoid arrangement in the neutral position.

4. The latch device of claim 1, wherein the electrical solenoid arrangement comprises a first solenoid and a second solenoid positioned symmetrically about a longitudinal center of the electrical solenoid arrangement.

5. The latch device of claim 4, wherein the latch shaft and the magnetizable ring beam arrangement are movable into (i) the first deflection position in response to a larger electrical signal being supplied to the first solenoid than the second solenoid, (ii) the second deflection position in response to the larger electrical signal being supplied to the second solenoid than the first solenoid, and (iii) a neutral position in response to no electrical signal being supplied to the first solenoid and the second solenoid.

6. The latch device of claim 1, further comprising a mechanical latch including:
   at least one latch ball positioned on a circumference of the latch shaft;
   an annular groove formed into the latch shaft; and
   a control element configured to apply a force to the at least one latch ball for pushing the at least one latch ball into the annular groove.

7. The latch device of claim 6, wherein the mechanical latch is configured to lock the latch shaft in the third deflection position.

8. The latch device of claim 1, wherein the latch device is coupled to the hydraulic valve, the hydraulic valve included within a hydraulic system comprising:
- an actuation lever coupled to the hydraulic valve;
- a hydraulic consumer hydraulically coupled to the hydraulic valve;
- a hydraulic pump coupled to the hydraulic valve;
- a sensor coupled to the hydraulic consumer or the hydraulic valve and configured to transmit a sensor signal; and
- an electronic control unit coupled to the hydraulic valve and the sensor, the electronic control unit configured to receive the sensor signal from the sensor and operate the hydraulic valve based on the sensor signal.

9. The latch device of claim 8, wherein the sensor is a pressure sensor coupled to the hydraulic consumer and configured to detect a pressure in the hydraulic consumer, and wherein the electronic control unit is configured to interrupt an electrical signal to the electrical solenoid arrangement in response to determining that the pressure in the hydraulic consumer exceeds a threshold.

10. The latch device of claim 9, wherein the latch device is configured to move the latch shaft into a neutral position between the first deflection position and the second deflection position in response to the interruption in the electrical signal.

11. The latch device of claim 8, wherein the sensor is coupled to the hydraulic valve and configured to detect a position of the latch shaft, and wherein the electronic control unit is configured to determine an electrical signal to transmit to the electrical solenoid arrangement based on the position of the latch shaft.

12. The latch device of claim 1, wherein the latch device is included in a hydraulic valve of a hydraulic system comprising an input device coupled to an electronic control unit, wherein the input device is configured to transmit an input signal and the electronic control unit is configured to receive the input signal from the input device and operate the hydraulic valve based on the input signal.

13. A system comprising:
- a hydraulic valve including:
  - a latch shaft movable within a housing of the hydraulic valve;
  - a magnetizable ring beam arrangement that is coupled to the latch shaft between a first housing wall and a second housing wall, the magnetizable ring beam arrangement comprising a first ferromagnetic-adjusting ring, a second ferromagnetic-adjusting ring, and a tension element positioned between the first ferromagnetic-adjusting ring and the second ferromagnetic-adjusting ring; and
  - an electrical solenoid arrangement positioned within the housing and coaxially around the magnetizable ring beam arrangement, wherein the electrical solenoid arrangement is configured to: (i) receive a first electrical signal and responsively generate a first positioning force on the magnetizable ring beam arrangement configured to cause the magnetizable ring beam arrangement to move, in a first direction, into a first deflection position at which the magnetizable ring beam arrangement contacts the first housing wall and the tension element is uncompressed, (ii) receive a second electrical signal and responsively generate a second positioning force on the magnetizable ring beam arrangement configured to cause the magnetizable ring beam arrangement to move, in a second direction, into a second deflection position at which the magnetizable ring beam arrangement contacts the second housing wall and the tension element is uncompressed, the second direction being opposite to the first direction, and (iii) receive a third electrical signal and responsively generate a third positioning force on the magnetizable ring beam arrangement configured to cause the magnetizable ring beam arrangement to move in the first direction past the first deflection position and into a third deflection position at which the magnetizable ring beam arrangement contacts the first housing wall and the tension element is compressed;
- an input device configured to transmit input signals; and
- a control unit coupled to the hydraulic valve and the input device, the control unit configured to receive the input signals from the input device and operate the hydraulic valve based on the input signals, wherein the control unit is configured to cause the hydraulic valve to enter
  (i) the first deflection position in response to a first input signal from the input device,
  (ii) the second deflection position in response to a second input signal from the input device,
  and (iii) the third deflection position in response to a third input signal from the input device.

14. The system of claim 13, wherein the magnetizable ring beam arrangement is positioned coaxially around the latch shaft and configured to move the latch shaft along a longitudinal axis of the hydraulic valve in response to a positioning force, and further comprising an adjustment spring arrangement coupled to the latch shaft for exerting a force on the latch shaft configured to move the latch shaft into a neutral position that is between the first deflection position and the second deflection position, wherein a longitudinal center of the magnetizable ring beam arrangement is in alignment with a longitudinal center of the electrical solenoid arrangement in the neutral position.

15. The system of claim 13, wherein the electrical solenoid arrangement comprises a first solenoid and a second solenoid positioned symmetrically about a longitudinal center of the electrical solenoid arrangement, and wherein the latch shaft and the magnetizable ring beam arrangement are movable (i) in the first direction toward the first solenoid into the first deflection position, and (ii) in the second direction toward the second solenoid into the second deflection position.

16. The system of claim 15, wherein the latch shaft and the magnetizable ring beam arrangement are movable into (i) the first deflection position in response to a larger electrical signal being supplied to the first solenoid than the second solenoid, (ii) the second deflection position in response to the larger electrical signal being supplied to the second solenoid than the first solenoid, and (iii) a neutral position in response to no electrical signal being supplied to the first solenoid and the second solenoid.

17. The system of claim 13, wherein the magnetizable ring beam arrangement comprises:
- at least two retention rings, a first retention ring of the at least two retention rings being positioned on a first side of the magnetizable ring beam arrangement and securing the first ferromagnetic-adjusting ring axially around the latch shaft, and a second retention ring of the at least two retention rings being positioned on a second side of the magnetizable ring beam arrangement that is opposite to the first side and securing the second ferromagnetic-adjusting ring axially around the latch shaft;
- wherein the tension element is configured to push the first ferromagnetic-adjusting ring against the first retention ring and the second ferromagnetic-adjusting ring against the second retention ring.

18. The system of claim 13, wherein the hydraulic valve further comprises a mechanical latch including:
   at least one latch ball positioned on a circumference of the latch shaft;
   an annular groove formed into the latch shaft; and
   a control element configured to apply a force to the at least one latch ball for pushing the at least one latch ball into the annular groove.

19. The system of claim 13, further comprising:
   an actuation lever coupled to the hydraulic valve;
   a hydraulic consumer hydraulically coupled to the hydraulic valve;
   a hydraulic pump coupled to the hydraulic valve; and
   a sensor coupled to the hydraulic consumer or the hydraulic valve and configured to transmit a sensor signal;
   wherein the control unit is coupled to the hydraulic valve, the sensor, and the input device, and the control unit is configured to receive the sensor signal from the sensor and operate the hydraulic valve based on the sensor signal.

* * * * *